United States Patent [19]

Robertson

[11] 4,263,853

[45] Apr. 28, 1981

[54] RAIL CAR END DOOR POSITIONING KEEPER ASSEMBLY

[75] Inventor: James C. Robertson, Ypsilanti, Mich.

[73] Assignee: Portec, Inc., Oak Brook, Ill.

[21] Appl. No.: 3,580

[22] Filed: Jan. 15, 1979

[51] Int. Cl.[3] .......................... B60J 5/06; B61D 17/06; B61D 19/00; E05B 65/16

[52] U.S. Cl. ........................................ 105/378; 49/384; 49/394; 105/410; 292/262

[58] Field of Search .......................... 49/383, 384, 394; 105/376, 410, 378; 292/67, 262, 338; 296/146; 410/26

[56] References Cited

U.S. PATENT DOCUMENTS

| | | | |
|---|---|---|---|
| 3,854,425 | 12/1974 | Allen | 105/410 X |
| 3,933,383 | 1/1976 | Walker | 292/262 |
| 3,967,850 | 7/1976 | Whisler | 296/146 |
| 3,996,860 | 12/1976 | Ravani et al. | 105/410 X |
| 4,084,516 | 4/1978 | Ravani et al. | 105/376 |
| 4,164,189 | 8/1979 | Fritz et al. | 105/410 X |

*Primary Examiner*—Howard Beltran
*Attorney, Agent, or Firm*—Emory L. Groff, Jr.

[57] ABSTRACT

A railway car having an end opening includes a swingable folding door assembly provided with a keeper mechanism carried by the door assembly and the adjacent side wall of the railway car. As the panels of the door assembly are folded from a flat, closed position overlying the car end opening to a collapsed, open position disposed substantially longitudinally extended away from the end of the car side wall, a guide rod carried by the door assembly is arcuately displaced to simultaneously horizontally shift a vertical locking pin to a position overlying an aperture in a lock plate whereupon gravity concurrently drops the connected rod and pin to secure the open door assembly in a fixed position.

10 Claims, 4 Drawing Figures

RAIL CAR END DOOR POSITIONING KEEPER ASSEMBLY

This invention relates generally, to a movable closure structure for the end opening of a vehicle and more particularly, to an improved end enclosure especially adapted for use in railway cars provided for the transportation of automobiles and having locking or keeper means to rigidly secure the enclosure in an open position.

Railway cars constructed for the express purpose of transporting automobiles have been known for some time and currently the most popular type of such rail vehicles comprises a railway car having side walls and opposite end openings which allow for the convenient drive-on and drive-off of the automobile cargo. Usually these railway cars are provided with one or two elevated decks whereby a bi-level or tri-level arrangement is provided to allow for the maximum shipping capacity for each rail car. Of paramount concern to both the shippers and customers is the protection or security of the automobiles being transported by rail cars and accordingly, it is almost mandatory that the confines of each rail car be substantially completely shielded on all surfaces in order to prevent pilferage and vandalism both during movement of the rail car and when stationary on a track siding.

In view of the foregoing it has been found necessary to provide displaceable end enclosures at both end openings of each such rail car, each end opening preferably being protected by means of a pair of shiftable door assemblies extending from the floor of the car to the top thereof. U.S. Pat. No. 3,996,860 issued Dec. 14, 1976 and U.S. Pat. No. 4,084,516 issued Apr. 18, 1978, both assigned to the assignee of this invention, illustrate examples of multi-level railway cars for the transportation of automobiles including displaceable end enclosures comprising pairs of folding door assemblies and the instant invention will be understood to be adaptable for incorporation with railway cars such as illustrated in each of these referenced patents.

In the case of U.S. Pat. No. 3,996,860, the multiple panels of each door assembly are folded back upon one another and subsequently pivoted to a storage location disposed flush with and parallel to the outside surface of the car side walls. In the other referenced U.S. Pat. No. 4,084,516 the door panels are folded back upon one another and subsequently longitudinally and slidably displaced to a recessed position by means of a trackway disposed within the interior of the rail car side walls. By the present invention, a simplied arrangement is presented allowing of locking of the folded door panels of each door assembly in an open position disposed in a direction extending away from the end opening of the rail car yet rigidly retained in this open position to allow operating personnel to climb an access ladder contained on the interior of one of the door panels. When the door assembly is opened to its full open position, shiftable means actuated thereby automatically drops into a locking position to retain the open door assembly until such time as operating personnel manually release the keeper means preliminary to the closing of the door assemblies. With the present arrangement, guide rollers or trackways are eliminated thereby removing a problem inherent with some of the prior art arrangements wherein dirt and debris are prone to clog the operating mechanism which mechanism is also subject to damage by impact from lading being loaded or unloaded.

Accordingly, one of the objects of the present invention is to provide an improved rail car door keeper for rigidly locking the folded panels of a door assembly in an open position extending substantially longitudinally away from the end opening of the rail car.

Still another object of the present invention is to provide an improved rail car door keeper including pivot cranks carried by swinging door assembly and arcuately displaceable to shift a horizontally reciprocating locking pin between alternate positions adjacent the side wall of the rail car.

A further object of the present invention is to provide an improved rail car door keeper including a horizontally shiftable vertical locking pin normally slidable upon a planar lock plate which lock plate includes an opening adjacent one end and through which the lock pin drops when shifted upon opening of a door assembly pivotally carried adjacent the end opening of the rail car.

Another object of the present invention is to provide an improved rail car door keeper including a guide rod carried by pivot cranks affixed to a swinging door assembly and arcuately displaceable upon opening the door assembly to horizontally displace a vertically reciprocating locking pin to a lock opening fixed relative the rail car side wall.

With these and other objects in view which will more readily appear as the nature of the invention is better understood, the present invention consists in the novel construction, combination and arrangement of parts hereinafter more fully described, illustrated and claimed.

Similar reference characters designate corresponding parts throughout the several figures of the drawings.

Figure 1:
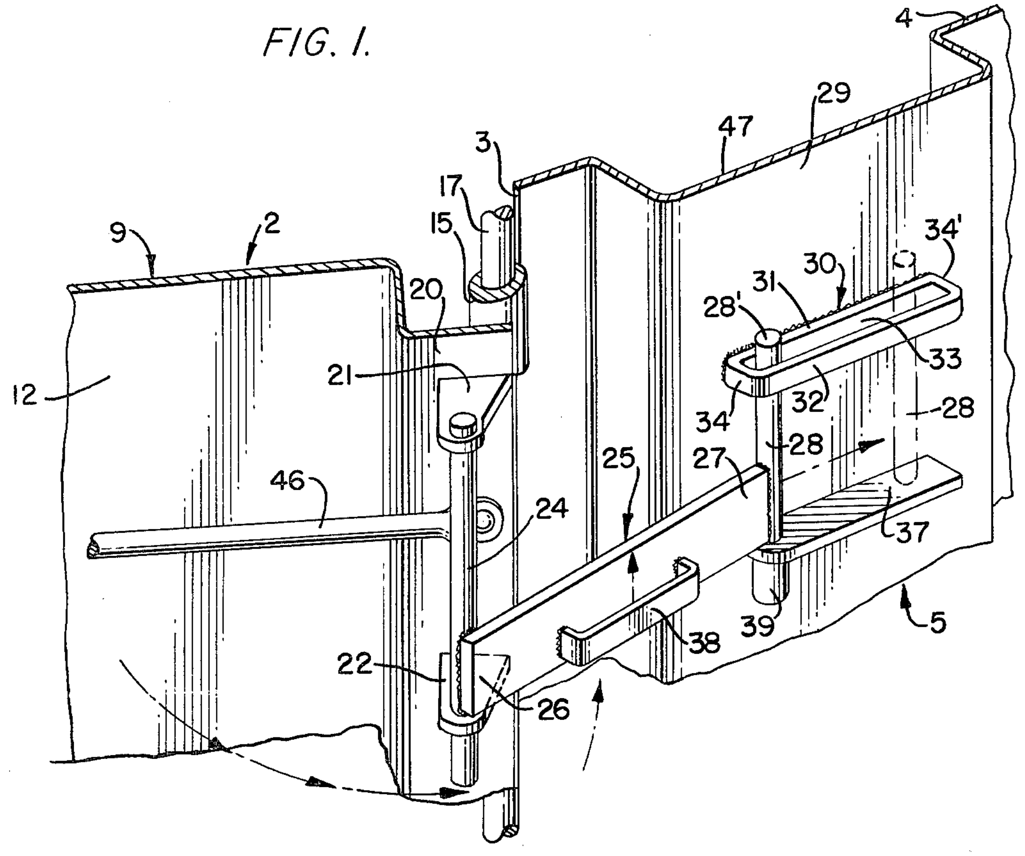
FIG. 1 is a side perspective view of the door keeper of the present invention.

Referring now to the drawings, it will be understood that the keeper or locking mechanism, generally designated 1, is provided for each door assembly 2 mounted adjacent the car end 3 of each side wall 4 of the rail car 5.

For purposes of clarity the keeper mechanism 1 and its attendent structure is illustrated only so much as it applies to one door assembly 2 since the very same structure is provided, in a mirror image, in association with the opposite railway car side wall 4, not only at the same illustrated car end 3 but also at the opposite car end (not shown). Additionally, it will be understood that each door assembly 2 may comprise any number of hingedly connected individual panels.

Figure 3:
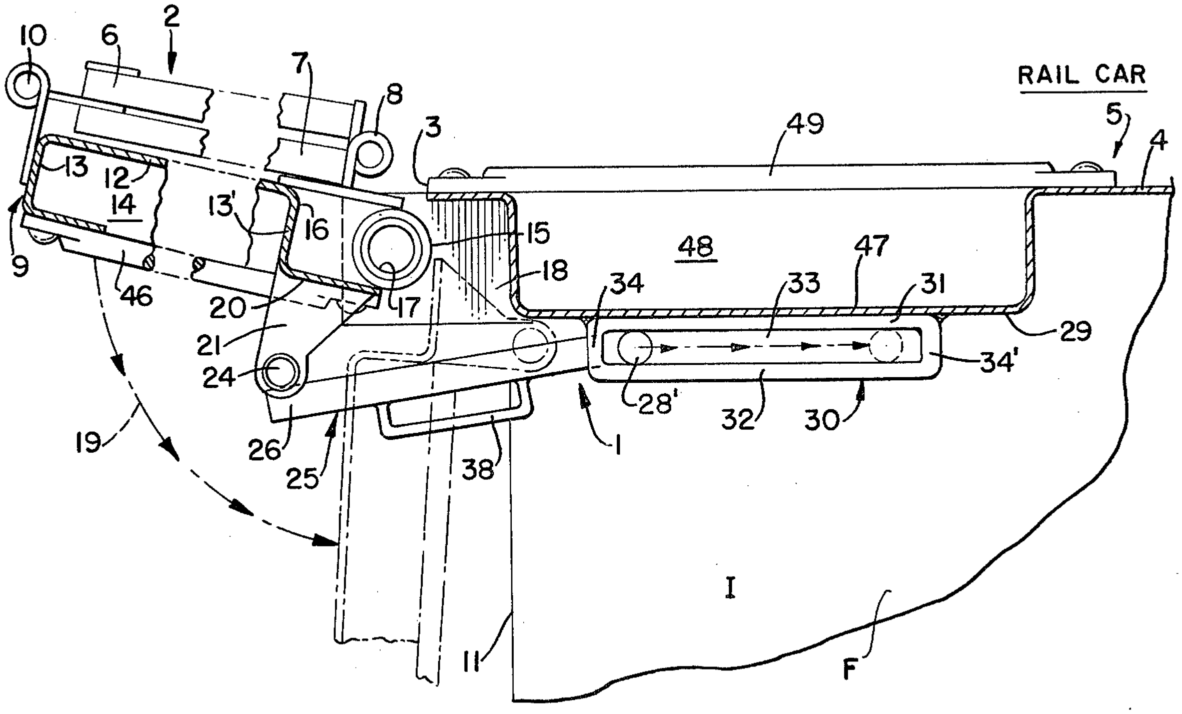
FIG. 3 is a horizontal sectional view including the structure of FIGS. 1 and 2.

In the illustrated example as shown in FIG. 3, the door assembly 2 includes a first, inside door panel 6 joined to a second, intermediate door panel 7 by means of the hinge 8 and in turn connected to a third, outside door panel 9 by means of a hinge 10. With this arrangement the three door panels may be collapsed or folded upon themselves in the illustrated Z fashion when moved from a closed position which seals off or overlies the end opening 11 defining the access to the interior I of the car 5. The inside face 12 of the third or outside door panel 9 is preferably dished inwardly and forms, along with the lateral walls 13—13', a cavity 14 the purpose of which will be explained hereinafter. This outside door panel 9 is suitably affixed to one or more hinge collars 15 adjacent the door panel outer edge 16 defined by the cavity lateral wall 13' and these hinge collars 15 are slidably disposed about a unitary vertical support or hinge rod 17 extending the full vertical height of the door assembly 2, which rod is suitably securely supported in a stationary manner upon the bottom plate 18 adjacent the floor or lower deck F of the railway car 5. An appropriate stationary support for the uppermost portion of the rods 17 may be suitably affixed relative the top of the car side wall 4 adjacent the car and side wall end 3 (not shown).

With the foregoing structure in mind, it will be seen that the entire door assembly 2 is swingably displaceable about the fixed axis of the hinge rod 17 from the open position as shown in FIG. 3 to a closed position as reflected by the arcuate arrow 19, when an operator wishes to move the door assembly to the closed position sealing off the end opening 11 of the car 5. During this closing motion it will follow that the first, inside door panel 6 is pivoted about the hinge 8 and the second, intermediate door panel 7 pivoted about the hinge 10 until all three door panels are disposed in a straight line overlying the end opening 11 and perpendicular to the railway car side wall 4.

Figure 2:
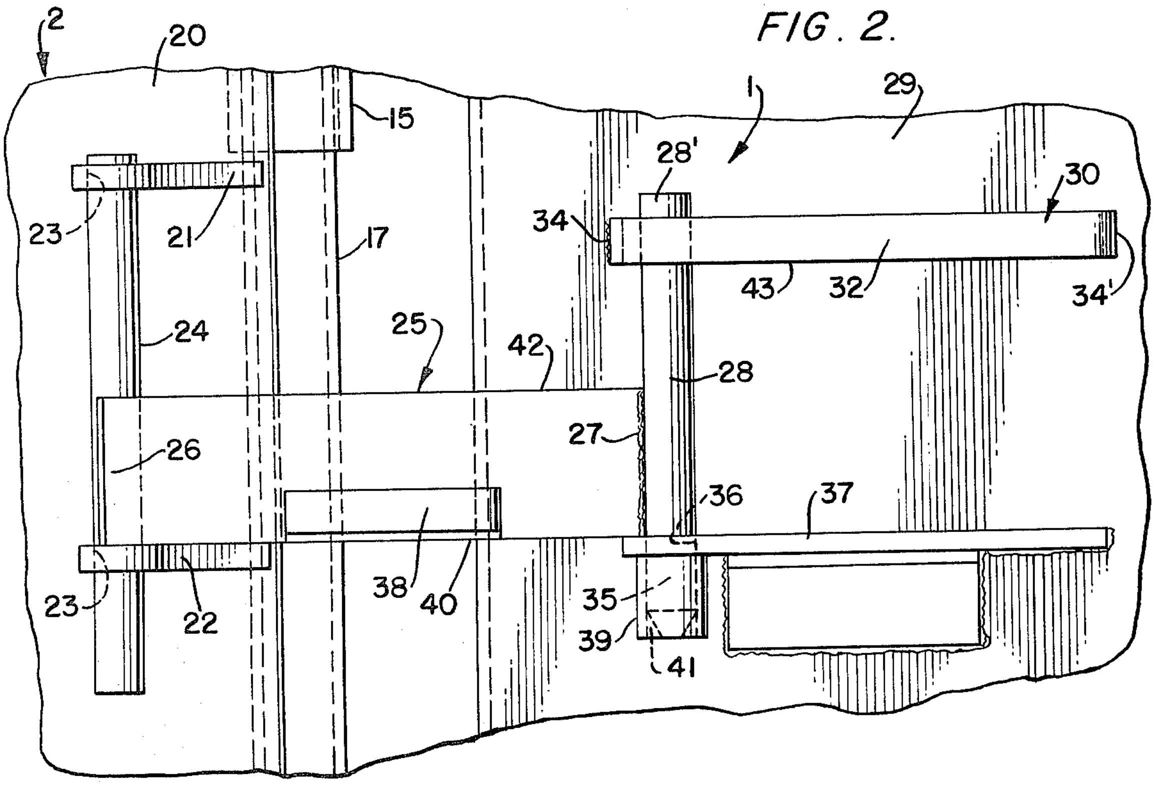
FIG. 2 is a side elevation of the structure of FIG. 1.

The full line position depicted in FIGS. 1, 2 and 3 illustrate the components of the door keeper mechanism 1 as they appear when the door assembly 2 is in its open and locked position. This structure includes a pair of vertically spaced apart pivot cranks fixedly attached to the flange 20 on the inside of the third, outside door panel 9 at a point adjacent the hinge rod 17. The top pivot crank 21 and bottom pivot crank 22 are of similar configuration and will be seen to include vertically aligned bores 23 adjacent their distal or outermost portions (FIG. 2). Disposed within these vertically aligned bores 23—23 is a cylindrical guide and stabilizer rod 24 having a substantially smooth periphery and of a diameter slightly less than that of the bores 23 to insure uninhibited vertical displacement within the bores. As shown most clearly in FIGS. 1 and 2, the axial extent or height of the rod 22 is substantially greater than the vertical distance between the two pivot cranks 21 and 22 for reasons which will become clear hereinafter. Extending rearwardly from the medial portion of the rod 24 is a shift bar 25 having a front end 26 rigidly affixed to the periphery of the rod 24 and an opposite, rear end 27 rigidly affixed to the medial portion of a cylindrical, vertically disposed locking pin 28.

This locking pin 28 is constrained for controlled rectinlinear displacement in a horizontal direction parallel to and immediately adjacent the inside surface 29 of the car side wall 4 by means of a fixed guide member 30. This guide member comprises an elongated element including an inside wall 31 fixed relative the car inside 29 and a spaced apart outside wall 32 defining a longitudinally extending slot or channel 33 therebetween bounded by the two opposite end stops 34—34'.

With the foregoing described structure in mind it will be seen that as the door assembly 2 is moved from its fully open position of FIG. 3 toward its closed position overlying the end opening 11 of the car, the door assembly will pivot about the center axis of the hinge rod 17 with the bores 23 of the two pivot cranks 21 and 22 describing an arc passing from the illustrated position in a counter-clockwise direction toward the interior I of the car 5. Concurrently with this motion, the front end 26 of the shift bar 25 will be arcuately moved rearwardly with its attached guide and stabilizer rod 24 while the opposite, rear end 27 of the shift bar 25 displaces the attached vertically disposed locking pin 28 from its forwardmost position adjacent the end stop 34 toward a rearward position adjacent the end stop 34'.

The foregoing described action will be understood to be permissible only after the locking pin 28 has been released from its lock position as shown in FIG. 2 of the drawings wherein it will be seen that the lower portion 35 of the locking pin is normally disposed through an opening 36 provided in the lock plate 37 with the upper pin end 28' no lower than the top of the guide member 30. In such a lock position, any attempt to close the door assembly 2 from the open position of FIG. 3 is resisted until an operator grasps the lift handle 38 attached to the medial portion of the shift bar 25 and applies an upward direction thereto. This upward movement of the shift bar 25 produces a simultaneous vertical displacement of the guide stabilizer rod 24 and locking pin 28 and continues until the lower portion 35 of the locking pin is clear of the opening 36 in the lock plate 37. When thusly cleared, the door assembly 2 may be pivoted about the hinge rod 17 at which time the previously described rearward displacement of the locking pin 28 occurs. As soon as the lower portion 35 of the locking pin has cleared the lock opening 36 the operator may release upward force upon the lift handle 38 and the lower portion 35 is then free to rest upon the top of the lock plate 37 and slide thereover during continued closing of the door assembly. The rearward displacement of the locking pin 28 continues in a longitudinally extending slot 33 of the guide member 30. The length of the channel 33 quite obviously is selected to accommodate the full rearward travel of the locking pin 28 up to the time the door assembly 2 is fully closed in a position perpendicular to the car side wall 4 and sealing off the end opening 11.

A lock collar 39 is preferably secured to the underside of the lock plate 37 in registry with the lock opening 36 and is of a vertical extent sufficient to fully mask the lower portion 35 of the locking pin when the bottom 40 of the shift bar 25 engages either or both the top of the bottom pivot crank 22 and top of the lock plate 37 as shown in FIG. 2 of the drawings. The bore 41 of the lock collar 39 will be seen to provide a close sliding fit with the lower portion 35 of the locking pin 28 and serves to retain the locking pin in a vertical position when disposed therewithin to thereby increase the resistance against any transverse force being applied to the open door assembly 2. An additional purpose of the lock collar 39 is to protect the lower portion 35 of the locking pin against damage from lading or other causes during loading and unloading of the car 5 and to preclude unintended unlocking of the keeper mechanism should an object or individual strike the lower portion 35 in an upward direction.

The length of the rod 24 and pin 28 as well as their relationship to the shift bar 25 and the spacing between the horizontal and parallel guide member 30 and lock plate 37 is critical to insure operation and retention of the assembled components of the keeper 1. The shift bar 25 is attached to the rod 24 and pin 28 at locations to insure that when in the locked position of FIG. 2 of the drawings, the upper portions of the two vertical members will still be confined within the bore 23 and slot 33 respectively. Additionally, it will be apparent that upon elevation of the shift bar 25 to unlock the keeper mechanism, it is important to insure that the top 42 of the shift bar 25 strikes the bottom 43 of the guide member 30 before the bottom tip of the guide and stabilizer rod 24 can be lifted out of the bore 23 of the bottom pivot crank 22.

Figure 4:
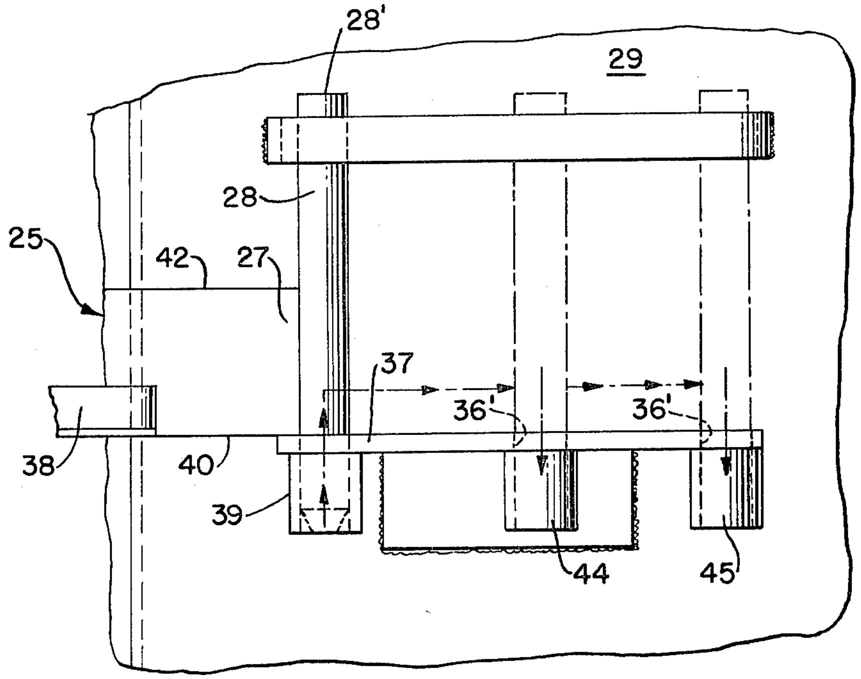
FIG. 4 is a modification of the lock plate of the present invention.

Up to this point the keeper mechanism 1 has been described as providing but a single locking position and that is associated with the positioning of the door assembly 2 in its fully opened location yet it will be appreciated that the very same lock plate 37 may be modified as shown in FIG. 4 of the drawings to provide additional alternate locking positions for the mechanism and accordingly, the attached door assembly 2. In this respect, an additional intermediate lock collar 44 and/or a forwardmost lock collar 45 may be attached to the lock plate 37 and, like the first described lock collar 39, include vertically aligned openings 36'—36' through the lock plate. The operation of these alternate lock collars 44–45 should be apparent when it is understood that during the closing of the door assembly 2 the lower portion 35 of the locking pin 28 is displaced rearwardly along the lock plate 37 by means of the overhead guide member channel 33 and thus the locking pin 28 may be lowered into either one of these additional lock collars to stabilize and retain the door assembly in eitheer a partially open position or in its fully closed position overlying the end opening 11. In connection with this latter described situation, only one of the keeper mechanisms 1 at each end of a car 5 would normally be provided with the forwardmost lock collar 45 to prevent locking of both door assemblies at either end of the car which would deny opening of the door assemblies from a point outside the car.

An important feature of the present invention is the disposition of the door assembly 2 when in the fully opened position and retained therein by means of the present keeper mechanism 1 as shown in FIG. 3 of the drawings. It will be seen that the door assembly is disposed in a position extending substantially longitudinally away from the end 3 of the car side wall 4. Besides locating the door assembly 2 in the most convenient position to facilitate loading and unloading of the car interior I, this disposition of the door assembly precludes violation of the required track-side clearance by positively preventing the door assembly from swinging any further than the lock position shown in FIG. 3 and additionally, further enhances the convenient utilization of the railway car 5 by operating personnel during loading and unloading of the car. Ladder means must obviously be provided to allow access by the operating personnel when servicing multi-level railway cars intended for the transportation of automobiles and the previously referred to U.S. Pat. No. 3,996,860 discloses one such solution wherein the inside face of one of the door panels of each door assembly is provided with a full height ladder which is exposed for use by personnel on the outside of the door assembly when in the opened position. However, in the referenced patent, this access ladder is swung to the outside of the car side wall when in the open and locked position thereby requiring personnel to swing around to the inside of the car to gain access to the desired deck within the interior thereof.

In the present invention, an improved arrangement is provided by the inclusion of a plurality of ladder steps or rungs 46 across the inside face 12 and spanning the cavity 14 of the third, outside door panel 9. In this manner full access to the entire vertical height of the car interior 1 is provided at a point immediately adjacent the inside surface 29 of the car side wall 4 such that operating personnel may climb the individual steps 46 to the desired elevation and thereafter merely step off the outside door panel 9 in a lateral direction and for a short distance to position themselves at any point within the car interior I. The described use of the ladder steps 46 is far more convenient than the use of the access ladder such as provided in the referenced U.S. Pat. No. 3,996,860 which is locked in a position outside of the car as opposed to the present invention wherein the ladder steps 46 are rigidly secured by means of the keeper mechanism 1 of the instant invention in a position with the steps 46 immediately laterally adjacent the car interior I.

When the door panels of the door assembly 2 are positioned in the closed location overlying the car end opening 11 it will be apparent that the ladder steps 46 are fully disposed within the interior of the car and thus inaccessible for use and illegal access to the upper reaches of the door assembly and car interior. The car side wall 4 may have the usual recess 47 formed therein adjacent the car end 3 so as to provide a cavity 48 associated with a plurality of ladder steps 49, which steps preferably only extend a short distance from the bottm of the car side wall 4 to preclude unwarranted access to the upper portion of the railway car 5 when the door assembly 2 is closed.

I claim:

1. An end enclosure for a transport vehicle end opening including, a vehicle floor, a vehicle side wall having an end adjacent said floor and vehicle end opening, said side wall having an inside surface disposed above said floor, vertical support means axially fixedly disposed adjacent said side wall end, a door assembly swingably mounted upon said support means for alternate displacement between a closed position overlying said vehicle end opening and an open position outside the confines of said vehicle floor and side wall allowing free access to said vehicle end opening, a keeper mechanism between said door assembly and side wall, said keeper mechanism including vertically displaceable rigid shift means having a front end pivotally connected to and spaced from said door assembly, stationary horizontally extending guide means mounted on and spaced adjacent said side wall inside surface adjacent said side wall end, a longitudinally extending lock plate mounted beneath said guide means and having a lock opening therein, a locking pin having an upper portion within said guide means and a bottom portion engageable with said lock plate, and said shift means including a rear end attached to said locking pin whereby, swinging of said door assembly from said closed to said open position about said support means concurrently moves said shift means to horizontally displace said locking pin until overlying said lock opening whereupon said pin bottom portion axially drops into said lock opening to fixedly retain said door assembly in said open position.

2. An end enclosure acording to claim 1 wherein, said door assembly includes an outside door panel mounted upon said support means and at least one additional door panel hingedly connected to said outside door panel and foldable thereagainst.

3. An end enclosure according to claim 1 wherein, said door assembly includes a panel adjacent said support means having an inside face juxtaposed said vehicle end opening when said door assembly in said closed position, a pair of vertically spaced apart pivot cranks secured to said panel inside face and extending normal thereto, said cranks provided with vertically aligned bores, a rod slidably disposed through said crank bores and said shift means includes a bar having said front end fixed to said rod intermediate said cranks.

4. An end enclosure according to claim 3 including, a plurality of ladder steps on said panel adjacent said support means, said steps overlying said panel inside face and substantially normal to and adjacent said end opening when said door assembly is swung to said open position.

5. An end enclosure according to claim 3 wherein, said shift bar includes a bottom engageable with both the lower one of said cranks and said lock plate when said locking pin is disposed through said lock opening.

6. An end enclosure according to claim 5 wherein, said shift bar includes a top engageable with said guide means when lifted and said rod extends below said shift bar front end bottom a sufficient distance to remain within the lower one of said cranks when said shift bar top engages said guide means.

7. An end enclsoure according to claim 1 wherein said guide means includes a longitudinal channel disposed parallel to said vehicle side wall, and stop means at opposite front and rear ends of said channel restricting the displacement of said locking pin and swinging movement of said door assembly.

8. An end enclosure according to claim 1 including, a collar beneath said lock plate opening for receiving said locking pin bottom portion.

9. An end enclosure according to claim 1 including, manually engageable lift means on said shift means intermediate said front and rear ends.

10. An end enclosure according to claim 1 wherein, said lock plate includes at least one additional lock opening therethrough.

* * * * *